UNITED STATES PATENT OFFICE.

AUGUST DRESCHER AND HENRY ADAMS, OF NEWARK, NEW JERSEY.

POLISHING COMPOUND.

SPECIFICATION forming part of Letters Patent No. 667,008, dated January 29, 1901.

Application filed October 25, 1900. Serial No. 34,292. (No specimens.)

*To all whom it may concern:*

Be it known that we, AUGUST DRESCHER and HENRY ADAMS, citizens of the United States, residing at Newark, in the county of Essex and State of New Jersey, have invented certain new and useful Improvements in Polishing Compounds; and we do declare the following to be a full, clear, and exact description of the invention, such as will enable others skilled in the art to which it appertains to make and use the same.

The invention relates to a polishing compound for polishing purposes generally, and more particularly for lacquered metal without removing the lacquer therefrom.

The invention consists of the following ingredients: powdered white dextrine, powdered gum-tragacanth, acetic acid, hydrochloric acid, refined petroleum, oil of citronella, and distilled water.

To make one gallon of the preparation, we use, by weight, powdered white dextrine, four ounces; powdered gum-tragacanth, one and one-fourth ounces, and, by measure, acetic acid, four ounces; hydrochloric acid, one-fourth of an ounce; refined petroleum, sixty-four ounces; oil of citronella, one ounce; distilled water, fifty-six ounces. To this may be added twenty grains of any desired pigment, such as rouge. In manufacturing the compound the four ounces of powdered dextrine, one and one-half ounces of gum-tragacanth, and the twenty grains of rouge are first triturated in a large Wedgwood mortar, and then nineteen ounces of refined petroleum and one ounce of citronella are thoroughly mixed with the mass and rubbed or stirred for five minutes, and then the acids are added to thirty-two ounces of water, and this is added to the mixture in the mortar gradually, while continually stirring, until perfect emulsion is formed, and while still stirring the balance of the oil and water to make one gallon of the compound is gradually added. The specific gravity of the refined petroleum at 59° Fahrenheit is 0.79 to 0.80. The specific gravity of the hydrochloric acid at 59° Fahrenheit is 1.163. The specific gravity of the acetic acid at 59° Fahrenheit is 1.041.

Having thus fully described our invention, what we claim as new, and desire to secure by Letters Patent, is—

1. A polishing compound resulting from the mixing of the following ingredients in substantially the proportions herein stated: powdered white dextrine, gum-tragacanth, acetic acid, hydrochloric acid, refined petroleum, oil of citronella and distilled water, substantially as set forth.

2. A polishing compound resulting from the mixing of the following ingredients in substantially the proportions herein stated: powdered white dextrine, powdered gum-tragacanth, acetic acid, hydrochloric acid, refined petroleum, oil of citronella, distilled water, and a coloring-pigment, substantially as set forth.

In testimony whereof we have hereunto set our hands in presence of two subscribing witnesses.

AUGUST DRESCHER.
HENRY ADAMS.

Witnesses:
JOSEPH P. MURPHY,
ULRICH A. ABRAHAMS.